United States Patent
Kumar et al.

(10) Patent No.: US 8,279,229 B1
(45) Date of Patent: Oct. 2, 2012

(54) SYSTEM, METHOD, AND COMPUTER PROGRAM PRODUCT FOR PROVIDING ACCESS TO GRAPHICS PROCESSOR CPU CORES, TO BOTH A GRAPHICS PROCESSOR AND A CPU

(75) Inventors: Ratin Kumar, Santa Clara, CA (US); Charles T. Inman, Redwood City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1010 days.

(21) Appl. No.: 12/259,078

(22) Filed: Oct. 27, 2008

(51) Int. Cl.
*G06F 15/00* (2006.01)
*G06F 15/16* (2006.01)
*G06T 1/00* (2006.01)

(52) U.S. Cl. .................. 345/502; 345/501; 345/522

(58) Field of Classification Search ............. 345/501, 345/502, 522
See application file for complete search history.

(56) References Cited

U.S. PATENT DOCUMENTS

| | | | |
|---|---|---|---|
| 2005/0219253 A1* | 10/2005 | Piazza et al. | 345/557 |
| 2007/0294696 A1* | 12/2007 | Papakipos et al. | 718/102 |
| 2008/0276262 A1* | 11/2008 | Munshi et al. | 719/328 |
| 2008/0316216 A1* | 12/2008 | Bakalash et al. | 345/505 |
| 2009/0100277 A1* | 4/2009 | Lai et al. | 713/300 |
| 2009/0217280 A1* | 8/2009 | Miller et al. | 718/104 |
| 2009/0328037 A1* | 12/2009 | Sartori | 718/1 |
| 2010/0007646 A1* | 1/2010 | Tsuei et al. | 345/212 |
| 2010/0241758 A1* | 9/2010 | Oddie et al. | 709/231 |
| 2011/0169840 A1* | 7/2011 | Bakalash | 345/505 |

* cited by examiner

*Primary Examiner* — David T Welch
(74) *Attorney, Agent, or Firm* — Zilka-Kotab, PC

(57) ABSTRACT

A system, method, and computer program product are presented for providing access to graphics processor central processing unit (CPU) cores, to both a graphics processor and a central processing unit. In operation, access is provided to a plurality of central processing unit cores of a graphics processor, to both the graphics processor and a central processing unit. Additionally, first requests are received from the central processing unit to execute first code utilizing at least one of the central processing unit cores of the graphics processor. Furthermore, second requests are received from the graphics processor to execute second code utilizing at least one of the central processing unit cores of the graphics processor. Still yet, there is arbitrating among the first requests and the second requests.

20 Claims, 6 Drawing Sheets

US 8,279,229 B1

SYSTEM, METHOD, AND COMPUTER PROGRAM PRODUCT FOR PROVIDING ACCESS TO GRAPHICS PROCESSOR CPU CORES, TO BOTH A GRAPHICS PROCESSOR AND A CPU

FIELD OF THE INVENTION

The present invention relates to computer systems, and more particularly to using processing capabilities of embedded processors in such systems.

BACKGROUND

With the increasing need for processing in computer systems, it is desirable to utilize all capable processing resources available in such systems. For example, devices (e.g. graphics processing units, etc.) in the computer systems may include embedded processors that are under utilized. There is thus a need for addressing these and/or other issues associated with the prior art.

SUMMARY

A system, method, and computer program product are presented for providing access to graphics processor central processing unit (CPU) cores, to both a graphics processor and a central processing unit. In operation, access is provided to a plurality of central processing unit cores of a graphics processor, to both the graphics processor and a central processing unit. Additionally, first requests are received from the central processing unit to execute first code utilizing at least one of the central processing unit cores of the graphics processor. Furthermore, second requests are received from the graphics processor to execute second code utilizing at least one of the central processing unit cores of the graphics processor. Still yet, there is arbitrating among the first requests and the second requests.

DETAILED DESCRIPTION

Figure 1:
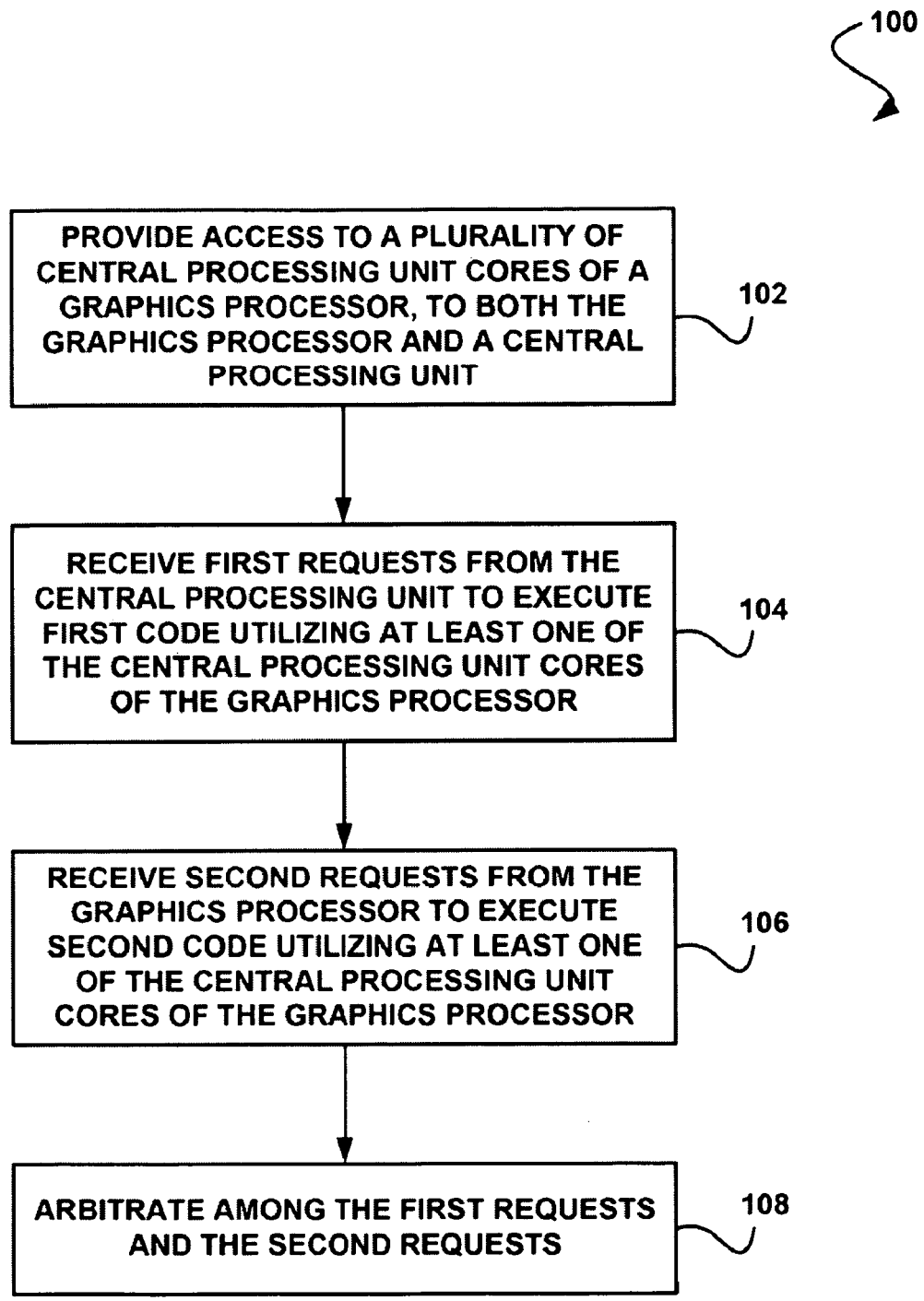
FIG. 1 shows a method for providing access to graphics processor central processing unit (CPU) cores, to both a graphics processor and a CPU, in accordance with one embodiment.

FIG. 1 shows a method 100 for providing access to graphics processor central processing unit (CPU) cores, to both a graphics processor and a CPU, in accordance with one embodiment. As shown, access is provided to a plurality of central processing unit cores of a graphics processor, to both the graphics processor and a central processing unit. See operation 102.

Additionally, first requests are received from the central processing unit to execute first code utilizing at least one of the central processing unit cores of the graphics processor. See operation 104. In one embodiment, the first requests may be received from a plurality of central processing units for providing access to the central processing unit cores of the graphics processor, to the plurality of central processing units.

Furthermore, second requests are received from the graphics processor to execute second code utilizing at least one of the central processing unit cores of the graphics processor. See operation 106. Still yet, there is arbitrating among the first requests and the second requests. See operation 108.

In this case, the arbitrating may include determining whether to execute the first code utilizing at least one of the central processing unit cores of the graphics processor, or whether to execute the second code utilizing at least one of the central processing unit cores of the graphics processor. In one embodiment, an arbitration policy may be utilized to determine whether to execute the first code utilizing at least one of the central processing unit cores of the graphics processor, or whether to execute the second code utilizing at least one of the central processing unit cores of the graphics processor. In various embodiments, the first code and the second code may be constructed utilizing different instruction sets or the same instruction set.

It should be noted that the graphics processor and a central processing unit may include various architectures. In one embodiment, the graphics processor and/or the central processing unit may include a parallel processing architecture (e.g. for parallel processing data, etc.). Additionally, the graphics processor may include one or more embedded CPUs. Furthermore, the graphics processor may include a graphics processing unit (GPU).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
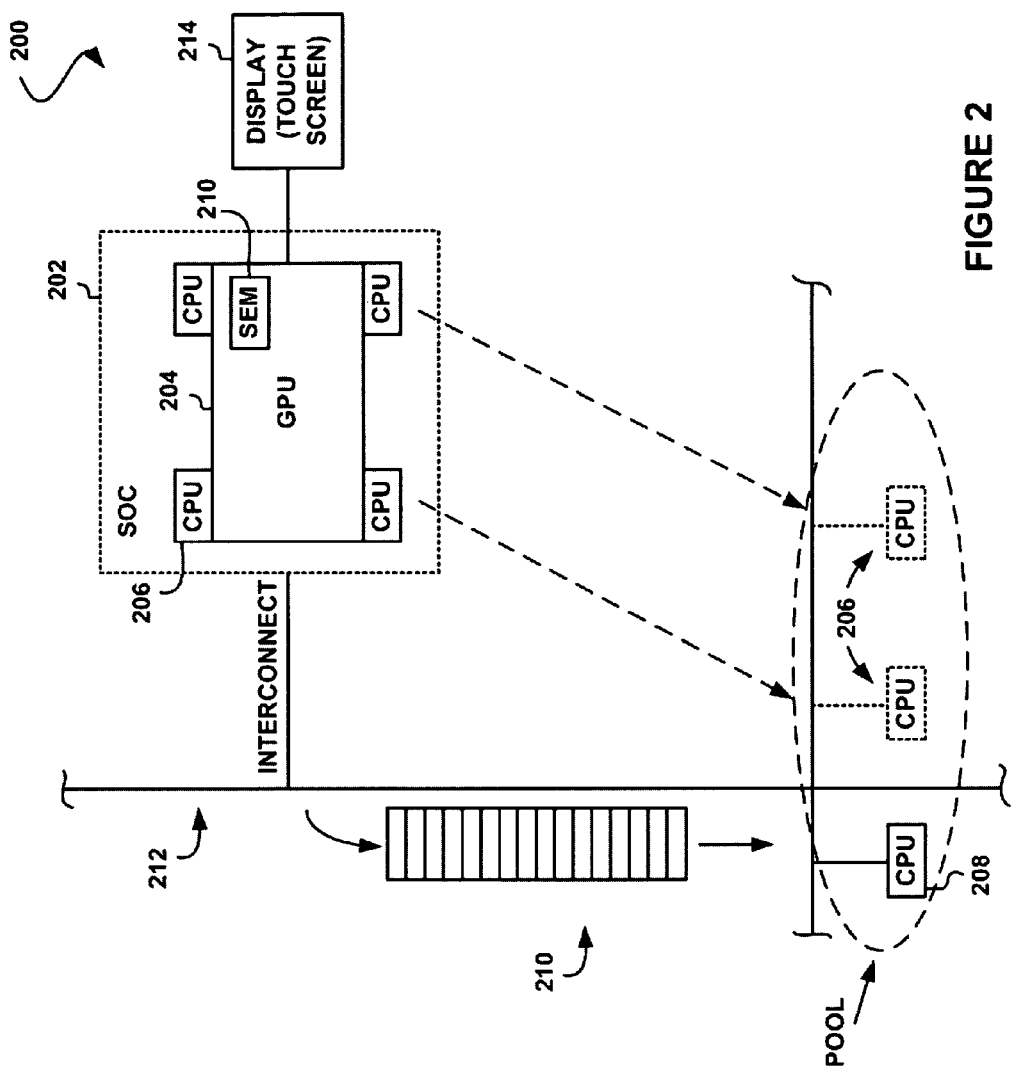
FIG. 2 shows a system for providing access to graphics processor CPU cores, to both a graphics processor and a CPU, in accordance with one embodiment.

FIG. 2 shows a system 200 for providing access to graphics processor CPU cores, to both a graphics processor and a CPU, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, a system on a chip (SOC) device 202 is provided. The SOC device 202 comprises a graphics processor that includes a GPU 204. As shown, the GPU 204 may include one or more embedded CPU cores 206. Furthermore, the system 200 includes one or more system CPU cores 208. In this case, processing elements for both the system CPU cores 208 and the embedded CPU cores 206 may be available for use by a system including the SOC device 202 and the system CPU cores 208.

In the context of the present description, a system refers to any system capable of processing data. For example, in various embodiments, the system may include a desktop computer, a lap-top computer, a personal digital assistant (PDA) device, a mobile phone device, or any other device capable of processing data.

The processing elements for both the system CPU cores 208 and the embedded CPU cores 206 of the GPU 204 may be available for use by an operating system of the system hosting the SOC device 202. In some cases, at least one of the embedded CPU cores 206 may function as the main CPU for the SOC 202. For example, this configuration may be used in the context of a video engine in a GPU.

In one embodiment, the system 200 and an operating system associated therewith may be configured in a manner such that the operating system is allowed to construct a dynamic pool of CPUs for general program execution. In this case, the dynamic pool may include at least one main system CPU 208 (e.g. as a dedicated CPU). Furthermore, the dynamic pool may grow when the GPU 204 is not using the embedded CPU cores 206.

It should be noted that, although in FIG. 2 the dynamic pool is illustrated as a physical grouping of CPU cores, the dynamic pool refers to a virtual pool. In other words, the embedded CPU cores 206 included in the pool are not physically relocated to the pool. Such CPU cores 206 may become available for general processing as result of being virtually placed in the pool.

In one embodiment, a data structure 210 may be utilized to indicate availability of the embedded CPU cores 206 of the GPU 204 for the dynamic pool. The data structure 210 may include any data structure capable of indicating the availability of the embedded CPU cores 206. For example, in one embodiment, the data structure 210 may include one or more semaphores.

In the context of the present description, a semaphore refers to any entity capable of storing a value (e.g. a variable, etc.) or abstract data type (e.g. an entity grouping several variables that may or may not be numerical, etc.) which is capable of indicating the availability of the embedded CPU cores 206. The data structure 210 may be stored in memory included with the graphics processor or the GPU 204.

In operation, one or more semaphores 210 may be communicated between the CPU 208 and the GPU 204 via a bus 212. The communicated semaphores 210 may be utilized to indicate the availability of the embedded CPU cores 206 of the GPU 204 for the dynamic pool. The operating system, or computer code associated therewith, may be configured and utilized to sense and exploit spare processing power in the GPU 204.

In one embodiment, the embedded CPU cores 206 may include a different hardware architecture than the system CPU 208. For example, the embedded CPU cores 206 and the system CPU 208 may utilize non-compatible instruction sets. In this case, the operating system may use a dual instruction copy of an operation corresponding to a first instruction set that is to be used on the second instruction set.

In another embodiment, the embedded CPU cores 206 may include the same hardware architecture as the system CPU 208. As an example implementation, the hardware of the system 200 may be designed to include more than one ARM cores 206 embedded in the GPU 204 for video processing. Similar ARM cores may also be utilized as the primary CPU 208 for the system 200.

Accordingly, the hardware of the system 200 may be configured to allow the GPU ARM cores 206 to be used in conjunction with the primary CPU 208 during the power on phase to parallelize the boot process. This may be possible because a video engine of the GPU 204 is idle during the boot process. Thus, parallel execution of the processors in the pool may be implemented and operations that are busy-wait operations may be isolated.

In one embodiment, the system 200 may implement different functionality for different modes of operation. For example, a graphics processor associated with the GPU 204 and the CPU 208 may be operated in a first mode of operation during which the graphics processor and the CPU 208 are both powered-up. In this first mode of operation, access may be provided to the CPU cores 206.

Additionally, the graphics processor and the CPU 208 may be operated in a second mode of operation during which the graphics processor is powered-up and the CPU 208 is powered-down. In this second mode of operation, only the graphics processor may be provided access to the CPU cores 206 of the graphics processor. As an option, this mode of operation may be utilized to implement functionality and/or hardware associated with the GPU 204. For example, in one embodiment, this second mode of operation may be utilized to operate a display 214 (e.g. a touch screen display, etc.).

Figure 3:
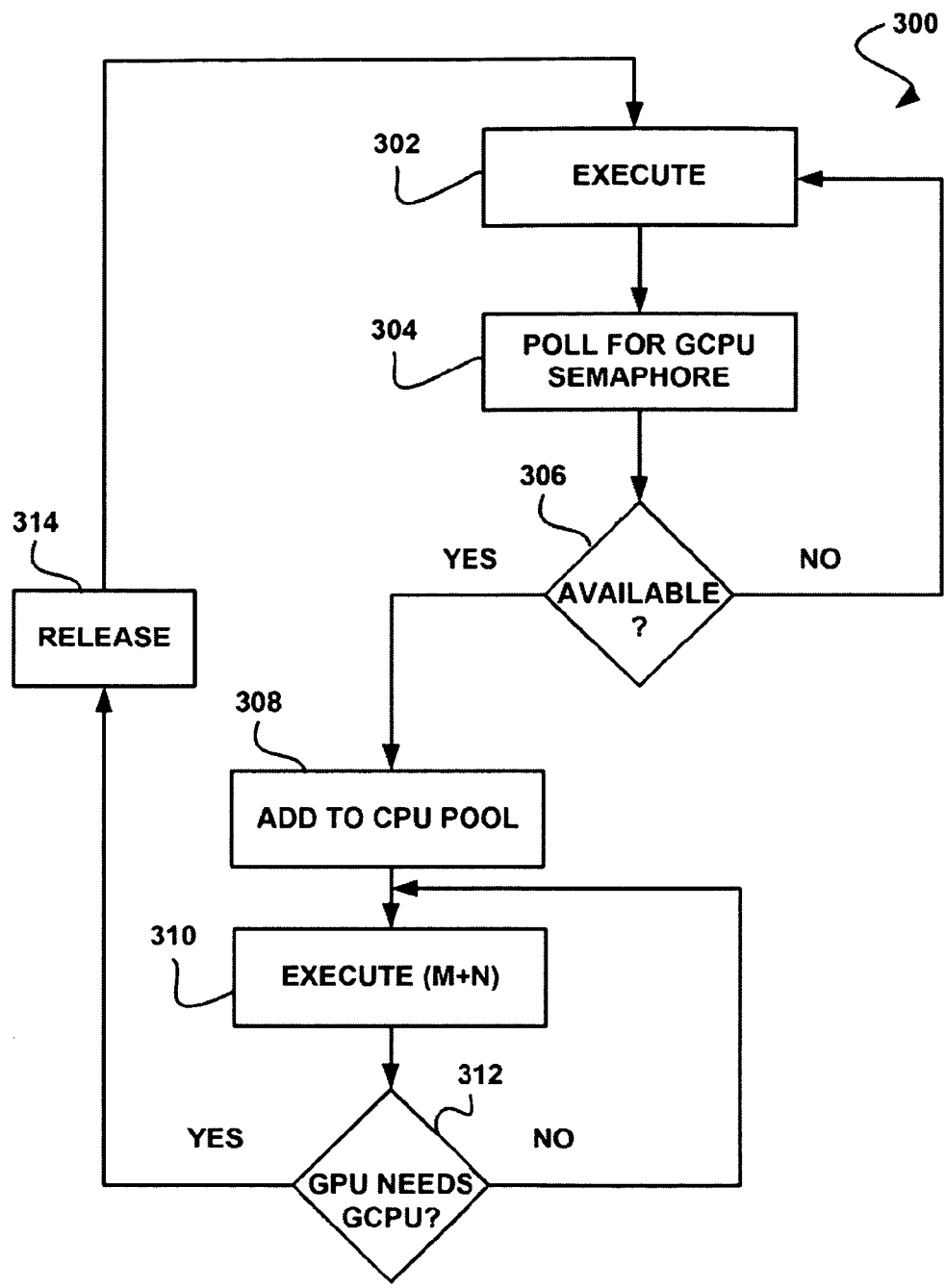
FIG. 3 shows a method for providing access to graphics processor CPU cores, to both a graphics processor and a CPU, in accordance with another embodiment.

FIG. 3 shows a method 300 for providing access to graphics-processor CPU cores, to both a graphics processor and a CPU, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, a CPU executes a first set of code. See operation 302. The CPU polls an operating system or code associated therewith for a data structure (e.g. a data structure including a semaphore, etc.) indicating the availability of any CPU cores of a graphics processor. See operation 304.

Based on the data structure, it is determined whether any CPU cores of the graphics processor are available. See operation 306. If it is determined that one or more CPU cores of the graphics processor are available, the available CPU cores are added to a CPU pool of available processors. See operation 308.

This pool of processors may then be used to execute the first set of code. See operation 310. In this case, execution may include executing the code on the main CPU (M), as well as any available GPU CPU cores (N) included in the pool. Furthermore, the processing may be implemented in parallel.

In parallel with the execution, it is determined whether the GPU needs one or more of the GPU CPU cores included in the pool. See operation 312. If it is determined that the GPU needs one or more of the GPU CPU cores, the CPU cores are released such that the GPU may utilize the released cores to process data. See operation 314.

In this way, access may be provided to a plurality of CPU cores of a graphics processor, such that both the graphics processor and a main system CPU may utilize the CPU cores of the graphics processor. For example, the main system CPU may send a first set of requests to execute first code using the CPU cores of the graphics processor. The graphics processor may then send a second set of requests to execute second code using the CPU cores of the graphics processor. It may then be determined how to allocate the CPU cores based on the first and the second set of requests in an arbitration process.

As an option, the arbitration may be performed utilizing a data structure. For example, the data structure may include at least one arbitration policy. Furthermore, the data structure may indicate a priority of the first requests and the second requests. This prioritization may be based on the type of processing to be implemented utilizing the CPU cores of the graphic processor, for example.

As another option, the data structure may indicate a maximum usage of the CPU cores of the graphics processor. For example, the data structure may indicate a maximum usage of the CPU cores of the graphics processor, by the main system CPU. Additionally, the data structure may indicate a maximum usage of the CPU cores of the graphics processor, by the graphics processor.

Figure 4:
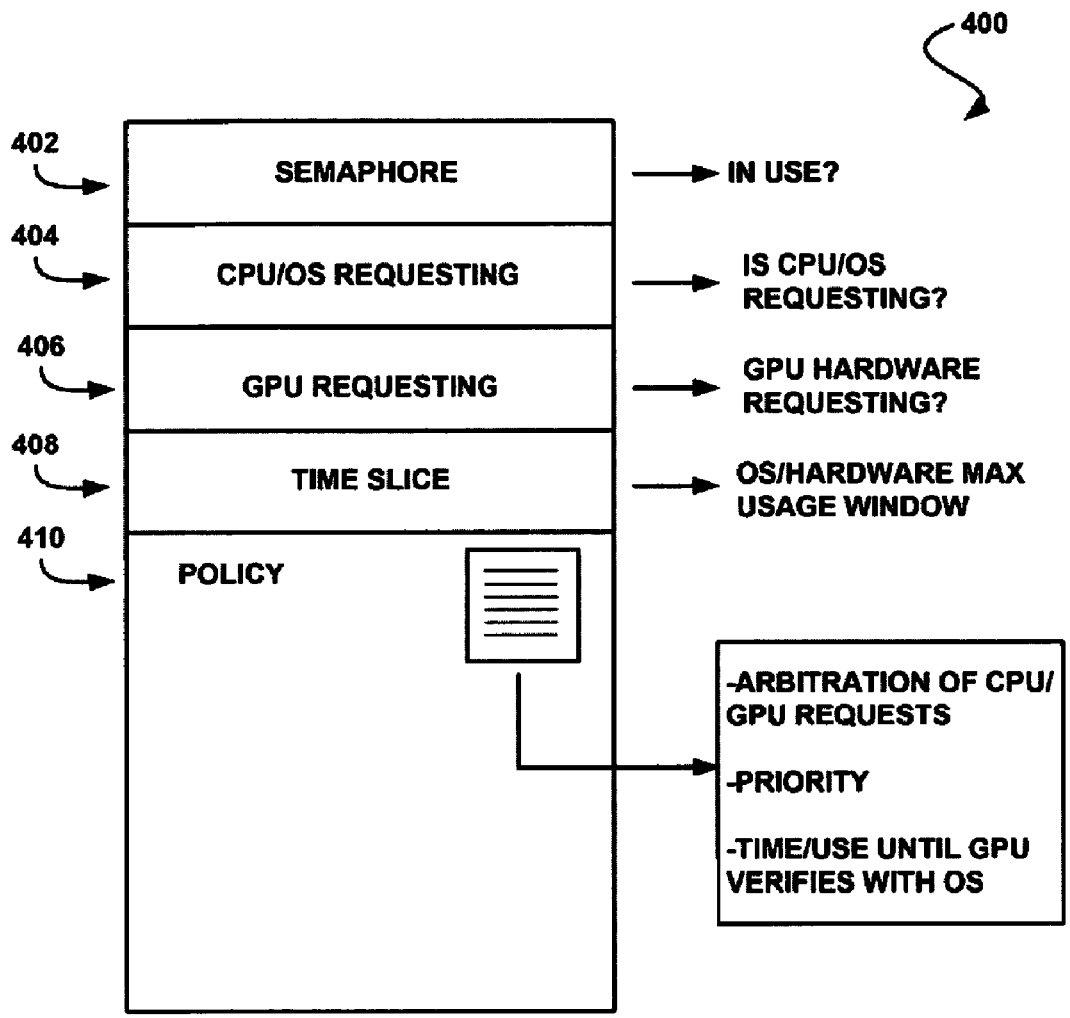
FIG. 4 shows a data structure for indicating an availability of a graphics processor CPU core, in accordance with one embodiment.

FIG. 4 shows a data structure 400 for indicating an availability of a graphics processor CPU core, in accordance with one embodiment. As an option, the data structure 400 may be implemented in the context of the functionality and architecture of FIGS. 1-3. Of course, however, the data structure 400 may be implemented in any desired environment. Further, the aforementioned definitions may apply during the present description.

As shown, the data structure 400 may include a semaphore 402 capable of indicating whether a graphics processor CPU core is currently in use. Additionally, the data structure 400 may include CPU/OS request information 404 indicating whether a CPU of a system and/or an operating system associated with the CPU requested the use of the graphics processor CPU core. Similarly, the data structure 400 may include GPU request information 406 indicating whether a GPU of the system and/or hardware associated therewith requested the use of the graphics processor CPU core.

As shown further, time slice information 408 may also be included. In this case, the time slice information may include a maximum usage window expected or allowed for the CPU/OS and/or the GPU and associated hardware. Still yet, the data structure 400 may include an arbitration policy 410 capable of being utilized to determine whether to allocate available graphics processor CPU cores to the main CPU or the GPU. In this case, the arbitration policy 410 may indicate a priority of utilization based on requests from the CPU and/or the GPU, time of use criteria, other use criteria (e.g. use until GPU requests use of cores, etc.), and/or various other information capable of being utilized for arbitration.

The data structure 400 may be shared/communicated between the GPU and the CPU such that graphics processor CPU core availability is known. It should be noted that, in one embodiment, each graphics processor CPU core may include a data structure. In this case, one or more of the data structures 400 may be stored in memory of the graphics processor.

Figure 5:
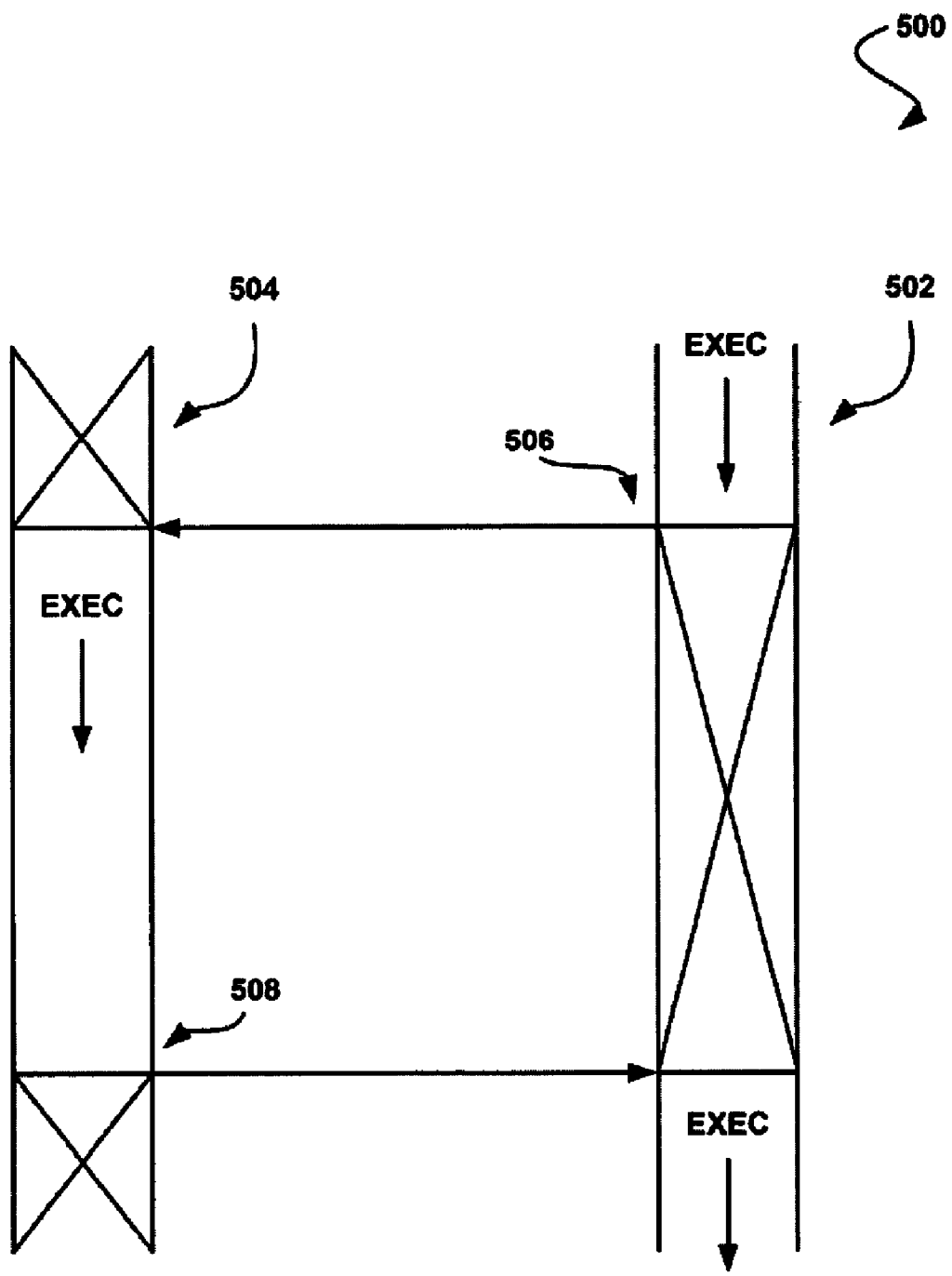
FIG. 5 shows a technique for providing access to graphics processor CPU cores, to a graphics processor and a CPU with different hardware architectures, in accordance with one embodiment.

FIG. 5 shows a technique 500 for providing access to graphics processor CPU cores, to a graphics processor and a CPU with different hardware architectures, in accordance with one embodiment. As an option, the present technique 500 may be implemented in the context of the functionality and architecture of FIGS. 1-4. Of course, however, the technique 500 may be carried out in any desired environment. Once again, the aforementioned definitions may apply during the present description.

As shown, a first code set 502 associated with a first hardware architecture is provided. Additionally, a second code set 504 associate with a second hardware architecture is provided. In operation, the first code set 502 is utilized during operation of the first hardware architecture (e.g. a graphics processor CPU core hardware architecture, etc.).

At a first point 506 in the execution, it may be determined that a second hardware architecture is to be utilized. In this case, the execution will be transferred from the first code set 502 to the second code set 504. The second code set is then utilized until a second point 508, when it is determined that the first architecture is to be used again. At this point, the execution may transfer back to the first code set 502. Using this technique, hardware architectures may be utilized where the CPUs embedded in a GPU are a different architecture (e.g. different instruction set compatibility, etc.) than an architecture of a main system CPU.

Figure 6:
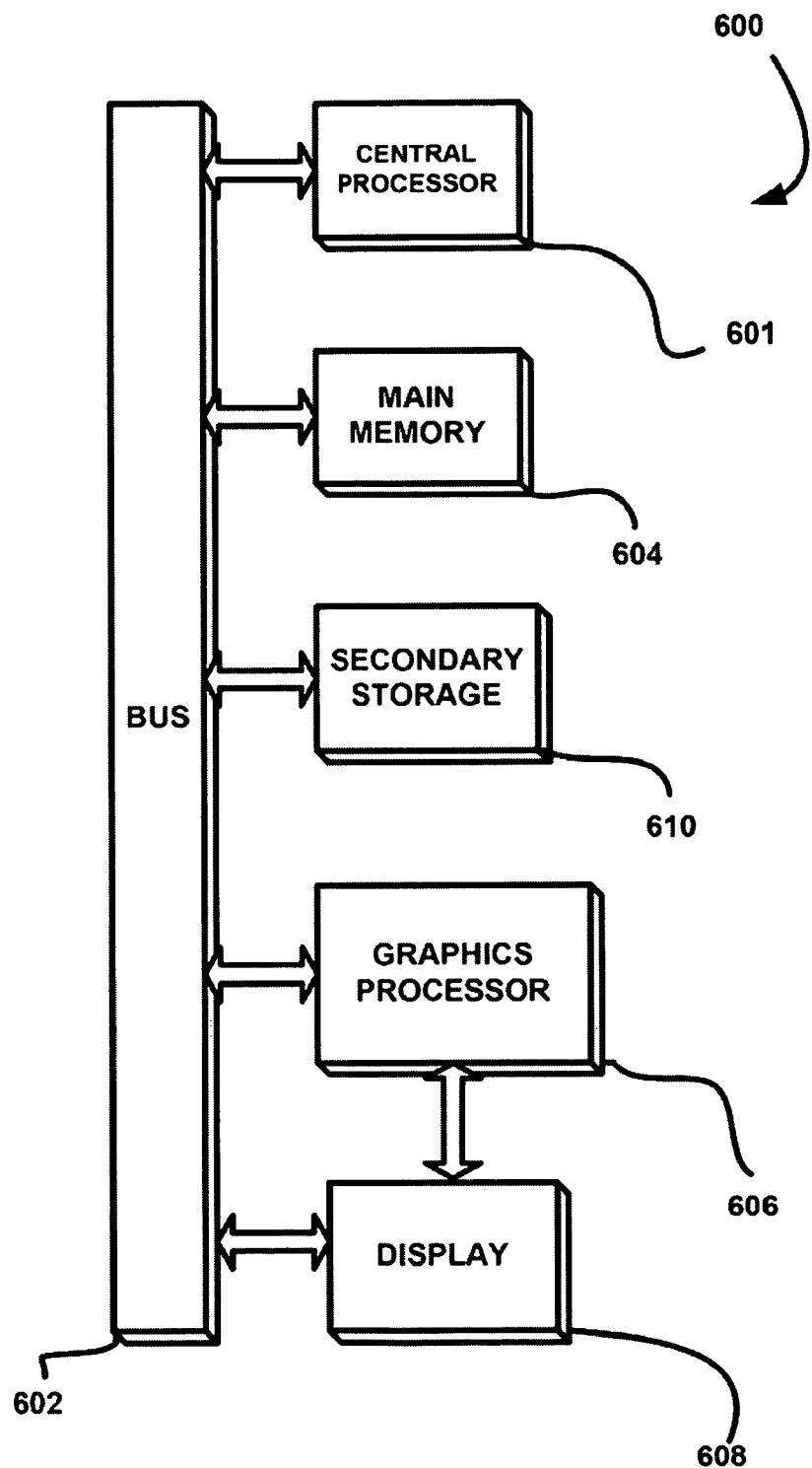
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method, comprising:
operating a graphics processor and a central processing unit in a first mode of operation during which the graphics processor and the central processing unit are both powered-up and access is provided to a plurality of central processing unit cores of the graphics processor, to both the graphics processor and the central processing unit by:
   determining that the central processing unit cores of the graphics processor are available,
   dynamically including each of the central processing unit cores of the graphics processor determined to be available in a virtual pool having at least one system central processing unit core external to the graphics processor,
   receiving first requests from the central processing unit to execute first code utilizing at least one of the central processing unit cores of the graphics processor included in the virtual pool,
   receiving second requests from the graphics processor to execute second code utilizing at least one of the central processing unit cores of the graphics processor, and
   arbitrating among the first requests and the second requests;
operating the graphics processor and the central processing unit in a second mode of operation during which the graphics processor is powered-up and the central processing unit is powered-down, and only the graphics processor is provided access to the central processing unit cores of the graphics processor;
wherein the plurality of central processing unit cores of the graphics processor are a same hardware architecture as the central processing unit.

2. The method of claim 1, wherein the first code and the second code are constructed utilizing different instruction sets.

3. The method of claim 1, wherein the first code and the second code are constructed utilizing the same instruction set.

4. The method of claim 1, wherein the arbitration is performed utilizing a data structure.

5. The method of claim 4, wherein the data structure indicates a priority of the first requests and the second requests.

6. The method of claim 4, wherein the data structure includes a semaphore.

7. The method of claim 4, wherein the data structure tracks the first requests and the second requests.

8. The method of claim 4, wherein the data structure indicates a maximum usage of the central processing unit cores of the graphics processor.

9. The method of claim 8, wherein the data structure indicates a maximum usage of the central processing unit cores of the graphics processor, by the central processing unit.

10. The method of claim 8, wherein the data structure indicates a maximum usage of the central processing unit cores of the graphics processor, by the graphics processor.

11. The method of claim 4, wherein the data structure includes at least one arbitration policy.

12. The method of claim 4, wherein the data structure is stored in memory of the graphics processor.

13. The method of claim 1, wherein the first requests are received from a plurality of the central processing units for providing access to the central processing unit cores of the graphics processor, to the plurality of central processing units.

14. The method of claim 1, wherein the graphics processor includes a parallel processing architecture.

15. The method of claim 1, wherein the graphics processor includes a graphics processing unit.

16. The method of claim 1, wherein each of the plurality of central processing unit cores of the graphics processor includes an ARM core and the central processing unit includes at least one ARM core.

17. The method of claim 1, wherein a power on phase of a boot process is parallelized utilizing the at least one of the central processing unit cores of the graphics processor in conjunction with the central processing unit.

18. A computer program product embodied on a non-transitory computer readable medium, comprising:
computer code for operating a graphics processor and a central processing unit in a first mode of operation during which the graphics processor and the central processing unit are both powered-up and access is provided to a plurality of central processing unit cores of the graphics processor, to both the graphics processor and the central processing unit by:
   determining that the central processing unit cores of the graphics processor are available,
   dynamically including each of the central processing unit cores of the graphics processor determined to be available in a virtual pool having at least one system central processing unit core external to the graphics processor,
   receiving first requests from the central processing unit to execute first code utilizing at least one of the central processing unit cores of the graphics processor included in the virtual pool,
   receiving second requests from the graphics processor to execute second code utilizing at least one of the central processing unit cores of the graphics processor, and
   arbitrating among the first requests and the second requests;
computer code for operating the graphics processor and the central processing unit in a second mode of operation during which the graphics processor is powered-up and the central processing unit is powered-down, and only the graphics processor is provided access to the central processing unit cores of the graphics processor;
wherein the plurality of central processing unit cores of the graphics processor are a same hardware architecture as the central processing unit.

19. An apparatus, comprising:
a plurality of central processing unit cores of a graphics processor configured to be accessed by both the graphics processor and a central processing unit when operating the graphics processor and the central processing unit in a first mode of operation during which the graphics processor and the central processing unit are both powered-up;
a virtual pool having at least one system central processing unit core external to the graphics processor and dynamically including each of the central processing unit cores of the graphics processor determined to be available;
at least one bus for communicating first requests from the central processing unit to execute first code utilizing at least one of the central processing unit cores of the graphics processor included in the virtual pool, and for communicating second requests from the graphics processor to execute second code utilizing at least one of the central processing unit cores of the graphics processor; and memory configured to store a data structure therein for arbitrating among the first requests and the second requests;

wherein only the graphics processor is provided access to the central processing unit cores of the graphics processor when operating the graphics processor and the central processing unit are in a second mode of operation during which the graphics processor is powered-up and the central processing unit is powered-down;

wherein the plurality of central processing unit cores of the graphics processor are a same hardware architecture as the central processing unit.

20. The apparatus of claim 19, wherein the central processing unit remains in communication with the memory and a display via the at least one bus.

* * * * *